June 17, 1952 — P. H. MITCHELL — 2,600,514
ELLIPTICAL TYPE STREET LIGHTING REFLECTOR INCORPORATING PARABOLIC REFLECTING AREAS
Filed Feb. 2, 1948 — 2 SHEETS—SHEET 1
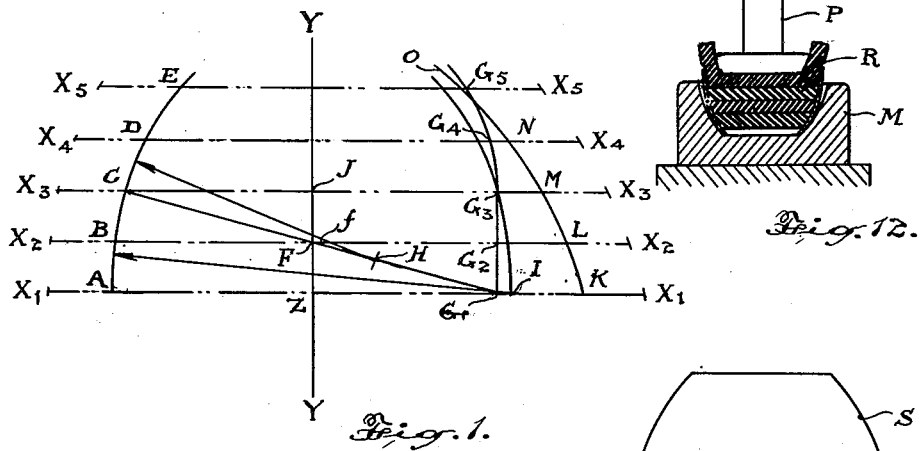
Fig. 1.
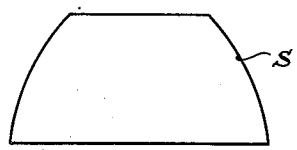
Fig. 12.
Fig. 3.
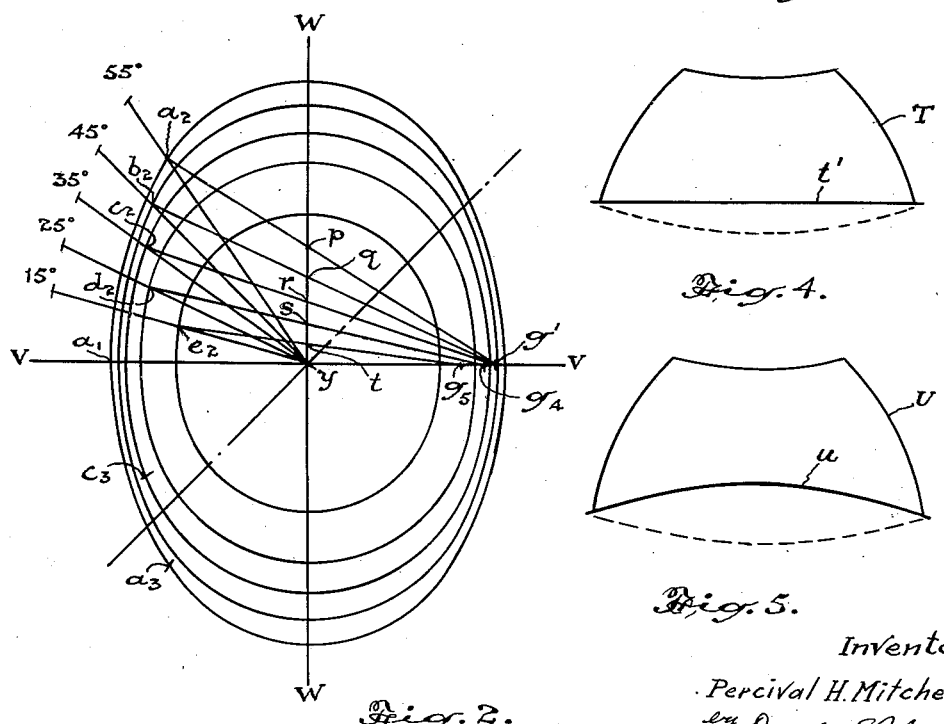
Fig. 2.
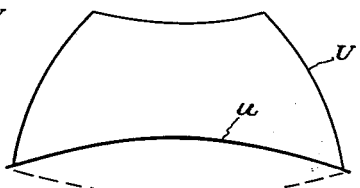
Fig. 4.
Fig. 5.
Inventor
Percival H. Mitchell
by Douglas S. Johnson June 17, 1952  P. H. MITCHELL  2,600,514
ELLIPTICAL TYPE STREET LIGHTING REFLECTOR
INCORPORATING PARABOLIC REFLECTING AREAS
Filed Feb. 2, 1948  2 SHEETS—SHEET 2

Inventor
Percival H. Mitchell
By Douglas S. Johnson
Agent

Patented June 17, 1952

2,600,514

UNITED STATES PATENT OFFICE 2,600,514

ELLIPTICAL TYPE STREET LIGHTING REFLECTOR INCORPORATING PARABOLIC REFLECTING AREAS

Percival H. Mitchell, Toronto, Ontario, Canada

Application February 2, 1948, Serial No. 5,879

4 Claims. (Cl. 240—103)

This invention relates to improvements in reflectors of the elliptical and oval type for use in street lighting, and the principal object of the invention is to provide a street lighting reflector which will distribute light from a light source in such a manner as to provide a substantially uniform illumination over a generally rectangular area below the light source ensuring the optimum distribution of light on the street pavements and adjacent areas.

A further important object is to provide a simple form of a complex reflecting system so that it may be economically manufactured.

A still further and important object is to devise an economical method whereby the reflectors can be readily and quickly formed into the required computed shapes to provide the desired light reflection and distribution.

A still further object is to devise a reflecting system which will enable existing normal elliptical or oval reflectors to be readily altered to change their reflecting characteristics to provide a more useful distribution of light on the street pavements.

The principal feature of the invention consists in the novel shaping of reflectors of the elliptical and/or oval type in their longitudinal and vertical aspects to incorporate in their smoothly continuous surfaces an extensive parabolic area adjacent the minor axis on each side of the reflector to effect a maximum concentration of reflected light rays in desired directions.

A further and important feature consists in the reforming of the surface areas of existing elliptical and/or oval reflectors to incorporate parabolic areas to augment their normal concentrations of light rays in desired directions.

A still further and important feature consists in the novel method of forming my improved elliptical and/or oval reflectors from annular spun metal bowls by deforming and expanding the bowls into a mould by means of a press and suitable resilient pads.

A still further feature consists in forming my reflectors with a flange around the base thereof to permanently hold the reflectors in their desired form.

Referring to the accompanying drawings:

Figure 1 shows cross sections of an ellipsoidal reflector in vertical planes through the minor and major axes illustrating the generation of the vertical curvatures of the reflector at the axes.

Figure 2 shows a series of superimposed ellipses of the reflector surface as cut by a series of horizontal planes through the reflector of Figure 1.

Figure 3 shows an elevation of an annular bowl as a step in the construction of the reflector.

Figure 4 shows the bowl of Figure 3 distorted as a succeeding step in the construction of a reflector.

Figure 5 is a view similar to Figure 4 but showing a reflector formed with an alternative form of bottom.

Figure 12 is a diagrammatic view illustrating my method of forming my reflector.

Figure 6:
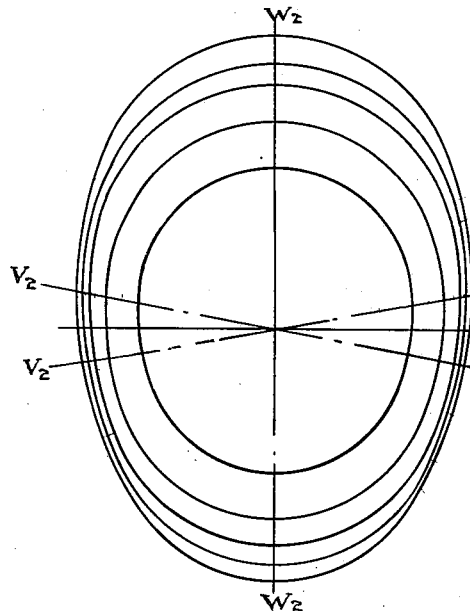
Figure 6 shows a series of superimposed ovals for an oval reflector corresponding to the ellipses in Figure 2.

In street lighting it is desirable to have a reasonable approach to uniformity of illumination of the pavement or street area allotted to each of the luminaires on the street. A standard lighting arrangement is to mount the luminaires at twenty-five feet above the pavement and spaced two hundred feet apart. Light rays directed from a luminaire thus mounted along the street at an upward angle of 76° from the nadir reach the pavement at one hundred feet distant, meeting and overlapping the corresponding rays from the adjacent luminaire.

Illumination of the pavement measured as horizontal foot candles varies as a cube of the cosine of the vertical angle and thus from only one source, pavement illumination at 76° to be equal to pavement illumination at the nadir requires seventy times the candle power of the light directed at the nadir.

If two adjacent luminaires contribute, thirty-five times the nadir candle power is required.

Equivalent relative intensities at all vertical angles and for any area on the pavement can be readily computed.

In practice uniform pavement illumination with a spacing height relation of eight to one for the luminaires cannot be obtained with any simple optical devices. It has been found however that elliptical reflectors for centre street mounting and oval reflectors for street side mounting have favourable characteristics in the distribution of reflected light.

With typical luminaires candle power intensity at the nadir is substantially equal to the candle power of the lamp used as the light source. Using conventional elliptical reflectors the candle power in the "beam" which directs light at highest intensity to a distant area is of the order of five times the candle power of the lamp, and in reflector-refractor types of luminaires this beam intensity is of the order of eight times the candle power of the lamp.

Thus it will be seen that to obtain the required illumination at points distant from the light source a much higher beam intensity is required.

The conventional elliptical reflectors show an elliptical cross section in any horizontal plane normal to the vertical axis and reflecting areas adjacent to the minor axis can be of such a form as to direct a concentration of light rays at a high angle up and down the street, while all other areas systematically direct light to the pavement area and its verges.

In a reflector with a normal ellipsoidal surface, where the ellipses of the surface cut by a series of equally spaced horizontal planes have the eccentricities of the ellipses decreasing systematically in the successive planes above the lowest plane, only a small reflecting area is developed to obtain maximum reflected light concentration in the critical direction, and these areas at the two ends of the minor axes merge smoothly into the continuing surface. The continuing surface directs reflected light at lowering and traversing angles to give a good although an unequal distribution.

The present invention has been devised to increase the area of the reflecting surface, concentrating and directing reflecting light in the critical direction to provide a more concentrated beam in the critical direction while retaining the distribution effected by the smoothly continuing surfaces of the normal ellipse.

This increase in reflecting area to provide a beam of increased candle power in the desired critical direction can also be applied to oval reflectors.

With reflectors designed in accordance with my invention and incorporating increased areas for concentrating rays in the critical direction a much more uniform illumination intensity over the pavement areas is obtained.

While I am particularly concerned with producing reflectors with more desirable reflecting characteristics, I also apply the principles of my invention to existing normal elliptical or oval reflectors by modifying such reflectors to incorporate the desired substantially large concentrating reflector surfaces.

Dealing with my reflectors in the following description, it will be understood that the ellipses referred to are not mathematically true ellipses but are composed of two pairs of circular arcs joined to make a continuous figure.

Ovals are also of four arcs. Parabolas are developed on a parabolic axis as circular arcs with centre on the axis and radius equal to twice the focal length. These parabolas are true parabolas adjacent to the axis at 30° outward therefrom, as measured from the focus, reflected rays would be directed inward towards the axis at an angle of the order of 1° and would not be parallel to the axis, as in the case of a mathematically true parabola. However, parabolic surfaces developed as spherical surfaces with radius equal to twice the focal length are found to be satisfactory for developing my reflector surfaces.

With reference to the accompanying drawings, Figure 1 shows cross sections of an ellipsoidal reflector in a vertical plane through the vertical axis YY of the reflector and through the minor and major axes of the ellipses in horizontal planes, which define ellipsoidal surfaces. The figure shows the trace of five horizontal planes for reference in generating the desired reflector surfaces. These planes as they cut the figure are shown as $X_1X_1$, $X_2X_2$, etc., $X_2X_2$ being the focal plane in which the lamp filament $f$ and focus F lie symmetrically with this plane and the axis YY. $X_1X_1$ is the base plane which is tentatively the plane of the reflector bottom. Planes $X_3X_3$, $X_4X_4$ and $X_5X_5$, above plane $X_1X_1$, are spaced equally with the space between $X_1X_1$ and $X_2X_2$, the actual spacing being determined in the first steps of the design development as will now be explained.

With the above arrangement the intersection of the vertical axis YY and the focal plane $X_2X_2$ is therefore the optical centre or focus F on which the filament of an incandescent lamp is centered. In the development of the reflector surfaces the "beam" angle in a vertical plane for street lighting distribution in the critical direction up and down the street is arbitrarily chosen, for illustration, as 75 degrees, which is standard practice, that is 75 degrees above the nadir or 15 degrees below the focal plane. The line $CFG_1$ is drawn through F at 15 degrees to $X_2X_2$. $FG_1$ is made to equal CF in length and the line of the horizontal plane $X_1X_1$ is drawn through $G_1$. With $G_1$ as centre and $G_1C$ as radius the arc ABC is drawn, then AZ is the semi-minor diameter of the reflector at the base plane $X_1X_1$ and AZ, for a 15 degree inclination of $CFG_1$ is 1.034 times the length of CF; so that if the desired semi-minor diameter of the reflector is fixed in advance, CF and $FG_1$ are known. For example, if the semi-minor diameter at the base plane is to have the practical dimension of 3.1 inches and minor diameter of 6.2 inches, the radius of the circular arc $CG_1$ is 6 inches. Determination of the centre $G_1$ locates the base plane $X_1X_1$, determining the spacing with the focal plane; and then the other planes are spaced equally.

The circular arc ABC is for all practical purposes as explained above a parabola with F as focus coincident with the optical centre, and $CFG_1$ as parabolic axis, and any reflecting point on this arc reflects light rays from the source $f$ at the focus downward at 15 degrees below the horizontal plane and parallel with a vertical plane through the minor axis of the reflector. The opposite bottom edge of the reflector is shown at I and it is necessary that reflected light will be directed below this. Above the parabolic arc ABC the continuing curvature CDE can be elliptical or an arc of a circle so that filament light reflected from any reflecting point on this line is directed under I. The point H on the radius $CFG_1$ is a convenient centre for CDE as a circular arc. Then light reflected from successive points upward is directed at successively lower angles than the beam angle and parallel with a plane through the minor axis of the reflector.

The point $G_1$ of Figure 1 is also the centre for the arcs of the ellipses in the three lower horizontal planes $X_1X_1$, $X_2X_2$ and $X_3X_3$, at and adjacent to their minor axes. Then the curved surface having height equivalent to the arc ABC and having in addition horizontal length, is a true spherical surface with centre at $G_1$ and is for all practical purposes a parabolic surface with F as focus and $CFG_1$, lying in a vertical plane at the minor axis, as parabolic axis. Being a spherical surface, in any horizontal plane a circle with centre on the vertical line locus $G_1G_2G_3$ and with radius as measured horizontally from the locus to the arc ABC will describe the trace of the spherical surface in the respective plane.

Figure 2 shows the traces of five ellipses defining tthe peripheral contour of my reflector in the five respective planes $X_1X_1$ to $X_5X_5$, superimposed, the outer ellipse being that in the base plane $X_1X_1$ and the second ellipse being that in the focal plane $X_2X_2$. The minor and major axes of the ellipses are VV and WW respectively intersecting at $y$. $ya_1$ is the semi-minor diameter at the base plane corresponding to AZ which has been determined. $g'$ is on the locus $G_1G_2G_3$ of Figure 1.

In forming the ellipses of Figure 2 the circular arcs at the minor axis of the three outer ellipses are drawn with $g'$, as centre. As it is necessary to provide a useful reflector surface at the termini of the major axes the length of circular arcs at the minor axis are systematically reduced. The radial lines $ya_2$, $yb_2$, $yc_2$, $yd_2$ and $ye_2$ from $y$ are arbitrarily drawn at 55, 45, 35, 25 and 15 degrees respectively from the minor axis VV. These are the limits for the respective circular arcs of the ellipses at the minor axis commencing with the outermost ellipse with $a_2$ as the limit. At the termini $a_2$, $b_2$ and $c_2$ of the three outer ellipses radii are drawn to $g'$. The intersections $p$, $q$ and $r$ of the radii $a_2g'$, $b_2g'$ and $c_2g'$ respectively with the major axis WW locates the centres for the circular arcs at the major axis of the three outer ellipses.

With a similar construction of arcs at the opposite termini of the axes the three outer ellipses are completed four arcs symmetrical with respect to the axes completing each ellipse.

It is necessary to select a locus for determining the centres for the circular arcs at the minor axes of the ellipses of the two uppermost planes in Figure 1 for describing the two innermost ellipses in Figure 2. In Figure 1 the locus $G_1G_2G_3$ is continued upward as an arc of a circle $G_3G_4G_5$ with centre at J on the axis YY. This locus is arbitrarily chosen but is found to be acceptable in practice. Centres $G_4$ and $G_5$ located in Figure 1 are located at $g_4$ and $g_5$ in Figure 2, and the arcs at the minor axes are drawn in. As before the centres for the arcs at the major axes are the intersections $s$ and $t$ of the radii $d_2g_4$ and $e_2g_5$ respectively with the major axis WW. In this manner the inner two ellipses are completed.

In Figure 1 the curved line KLMNO is plotted from measurement of Figure 2 showing the upward curvature of the reflector at the major axis. In tracing the reflected rays from the source at F it is found that light rays from the bottom at K are directed at an angle of 50° to the nadir, and at points successively upward the light rays are successively lowered until from a point at 0 they are directed at 25° to the nadir and these are all directed in line with the major axis. This distribution is acceptable.

A reflector constructed in accordance with the design developed in Figures 1 and 2 incorporates an extensive parabolic area at the minor axis on each side of the reflector, the area having height equivalent to the height of the arc ABC in Figure 1 and length as indicated in Figure 2 equivalent to the arc $a_2a_3$ at the bottom and arc $c_2c_3$ at the top. Light reflected from a point source from each whole area is directed substantially parallel with its parabolic axis in a concentrated beam. The reflector surfaces above and beyond the parabolic areas systematically direct reflected rays at lowering angles below the beam, and at horizontal angles tending away angularly from the minor axis as the major axis is approached. The lamp filament $f$ as source has a relatively large size resulting in overlapping of rays so that a smooth gradation of light intensities is effected over the whole illuminated area.

The making of a mirrored glass reflector in accordance with my design presents no difficulties.

For making a metal reflector, say of aluminum, my preferred method of construction is to use a spun annular bowl of design which, on distortion, by hand with side pressure, fits into an outside mould or die M, shown in Figure 12, of the form of the desired reflector as developed in Figures 1 and 2, contacting the mould at the reflector bottom line for a substantial portion of the elliptical arc at the minor axis and contacting the upward curvature at the minor axis.

This shell is then expanded into the mould by using an adequate press P of any suitable type and rubber pads R compressing into the reflector shell, stretching the metal to contact the mould at all points to permanently conform to the desired shape. A flange is formed around the base of the reflector shell by the same operation as will be later described to increase the rigidity of the shell and serve to retain it in its permanently distorted shape.

The annular bowl S, shown in Figure 3, as the first step toward the ultimate form, can be designed so that on distortion caused by forcing diametrically opposite peripheral portions of the bowl inwardly it conforms to the elliptical curvature of the reflector bottom in the region of the minor axis and also to the upward curvature at the minor axis but the bottom and upward curvatures at the major axis will not conform strictly to that shown in Figures 1 and 2 which are resultants of the arbitrary choice of arcs of the ellipses at the major axis as shown in Figure 2. In practice however, the bottom and upward curvatures at the major axis of a distorted annular bowl which will satisfy the requirements at the minor axis are found to be acceptable and the ellipses in Figure 2 are modified by adjusting the angles of the limiting radial lines, such as $ya_2$ and $yb_2$, so that the bottom and upward curvatures at the major axis of the final reflector correspond to that of the distorted annular bowl. Thus there is conformation of the distorted bowl with the forming mould at the reflector base and along the upward contours at both minor and major axes and the stretching of metal in the final forming operation is minimized by being confined only to the intermediate areas. The annular bowl in the described method of forming the reflector is made with depth in excess of reflector requirements and on conforming an elliptical shape in the mould M, which on a press has the reflector base upward, and with the mould levelled off to the plane of the reflector bottom, there is a maximum of surplus metal at the minor axis and a minimum at the major axis. The same rubber pad procedure will turn the standing surplus metal over and outward to form a horizontal flange which will hold the reflector in a permanently distorted form and the resulting flange is at the bottom of the reflector.

Figure 3 shows the annular bowl S before distortion and in Figure 4 as T after distortion in the mould M and forming to the desired ellipsoidal shape, as viewed towards the major axis. The bottom of the bowl is naturally bowed by distortion as shown by dotted lines having greater depth at the minor axis. The full line $t'$ represents the horizontal bottom of the reflector and the metal of the reflector below $t'$ is bent outward, into the plane of $t'$ to form a horizontal flange.

In some cases it may be desirable to carry the reflector bottom at the ends on the major axis lower than at the minor axis to provide lower cut-off in the "across the road" direction as the reflector is arranged with its major axis extending across the street. To meet such requirements further metal may be added to the bottom of the annular bowl and the flange of the reflector bottom may conform to a cylindrical surface with an axis for the cylinder in line with the minor axis and substantially below it. Figure 5 shows a reflector U with its bottom after distortion shown in dotted lines, the circular arc $u$ showing the final form of the bottom, the surplus metal below this, to the original bottom, being turned back to form the flange $u$, but when such surplus metal in the region of the minor axis is excessive for satisfactory flanging, a portion of the metal may be cut away before the flange is turned. While the flange is shown conforming to the surface of a cylinder, as providing a simple continuous flange, other forms of flanged bottoms may be used.

In Figure 1 the bottom of the reflector is shown for design purposes in the plane $X_1X_1$. It is obvious that the reflector bottom can be above this plane and if the bottom edge at the minor axis is at 10° below the focal plane as measured from F the reflector is adapted to the conventional 80 degrees cut-off above the nadir and 75 degree beam, both conditions being well established in street lighting practice. It will be noted that in Figure 1 the upward parabolic arc ABC extends from the bottom plane $x_1x_1$ to the third plane $x_3x_3$ and this is actually carried too high, when the reflector bottom coincides with the bottom plane, to permit the light rays from relatively large lamp filaments clearing under the opposite bottom edge of the reflector as shown. When the cut-off is at 80 degrees, however, the upper limit of the parabolic arc at C is satisfactory, otherwise the upper limit must be fixed to effect a sufficient clearance of the reflected rays.

The elliptical reflector is designed with the lamp filament $f$ at the focus. If the filament is raised on the axis YY the reflected light rays are lowered and the parabolic surfaces are efficient in directing substantially parallel rays at the lower angle. Lowering the filament raises the beam. If the lamp filament is moved along the major axis away from the axis YY the reflected light rays are directed along an axis outward at an angle to the minor axis and thus the reflector can be used in street-side mounted luminaires to illuminate the pavement area from a non-centered position. The location of the lamp filament adapts the reflector to the usual varied requirements for street lighting purposes.

The reflector can also be developed on an oval plan in which case the trace of the reflector surface at any plane is an oval instead of an ellipse. The pair of semi-minor axes of the ovals are inclined at a fixed angle to the major axis and are symmetrical with the major axis. Insofar as the development of a reflector side at the minor axis is concerned the procedure is identical with that of the reflector side shown in Figure 1.

Figure 6 shows the plan of the ovals on the respective planes and the minor axes $V_2V_2$ and minor axes extended are shown as inclined at 80 degrees to the major axis $W_2W_2$ so that with light source at the vertical axis light rays are directed on an axis 10 degrees outward accommodating to a street-side mounting condition.

The centres for the arcs of the ovals at the minor axis on the respective planes are the same as in Figure 2; the length of the arcs, however, are not symmetrically disposed with the minor axis and the termini of these arcs are determined by a series of radii selected to give suitable upward curvatures at the ends of the major axis. In general the light rays reflected from the smaller end which is the curb side in a side mounted unit are directed at a higher angle than the rays from the larger end, which is the street side.

Figure 7:
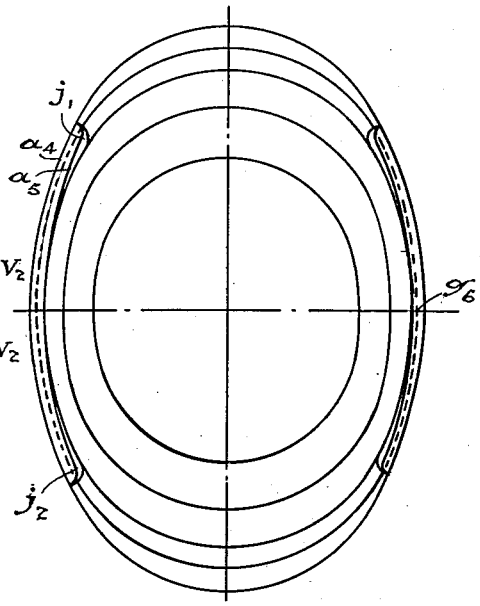
Figure 7 shows the trace of a concentrating surface applied to a normal elliptical reflector.

As described in the preferred manufacturing procedure for the elliptical reflectors, a form of conventional elliptical reflector can be made by distortion of an annular bowl and this will have the desired elliptical bottom and is correct in upward curvature at the minor axis and acceptable in upward curvature at the major axis. Such a reflector has an effective parabolic surface only immediately adjacent to the minor axis. In Figure 7 the ellipses for five planes corresponding to the planes in Figure 2 are shown. These ellipses form a true series having systematic change in the eccentricities of the ellipses and the form may be designated a normal ellipsoid. The outer ellipse, which is of the bottom plane, has the centre for the arc at the minor axis at $g_6$ corresponding to $g_1$ in Figure 2, while the centres for the arcs of the inner ellipses are systematically closer to the major axis. If the spherical area as developed for the centre $G_1$ in Figure 1 and the centre $g_1$ in Figure 2 is applied to this normal ellipsoid it will appear as traced by the circular arcs from the centre at $g_6$ coinciding with the elliptical arc in the bottom plane but extending outwardly in other planes as the arc progresses away from the minor axis. The normal ellipsoidal surface is pressed outward by forming means as already shown to permanently conform to the surface as described by the arcs $a_4$ and $a_5$ so that a portion of the original reflecting surface is replaced by a parabolic area which directs reflected rays on a parabolic axis. Transition areas $j_1$ and $j_2$ of minimum extent join the parabolic area at the ends and the top to the original ellipsoidal surface and these areas reflect light usefully.

Figure 9:
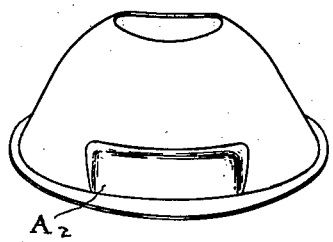
Figure 9 is a perspective view showing a reflector designed as in Figure 7 with a portion of the reflector reformed as a parabolic area.

Figure 9 shows a perspective view of a normal elliptical reflector modified or reformed in accordance with the configuration of Figure 7 to incorporate the parabolic area $A_2$ adjacent the minor axis on each side of the reflector.

Figure 10:
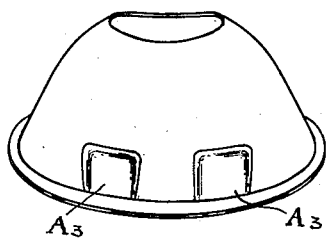
Figure 10 is a perspective view of a reflector of the type shown in Figures 7 and 9 but having a central portion of the parabolic area omitted, providing two parabolic areas on each side of the reflector spaced away from the minor axis.
Figure 11:
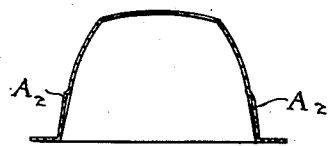
Figure 11 is a vertical sectional view of the reflector of Figure 9 taken on a vertical plane through the minor axis.

Figure 10 shows an alternative to the reflector shown in Figures 7 and 9 in which the central portion of the parabolic area $A_2$ is omitted so that there are two parabolic areas $A_3$, $A_3$ on each side of the reflector spaced away from the minor axis, leaving the area at the minor axis undisturbed.

Figure 8:
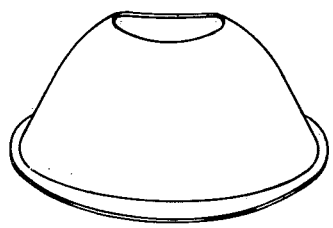
Figure 8 is a perspective view showing a general form of the reflector of Figures 1 and 2 as looking towards the reflector in a direction at right angles to the major axes.

The modified reflectors shown in Figures 9 and 10 give improved results comparable to the results obtained with my reflector shown in Figure 8 formed from a distorted annular bowl and providing continuous reflecting surfaces. It will therefore be appreciated that incorporating extensive parabolic areas in existing elliptical and oval reflectors will greatly improve their reflecting characteristics and will enable existing street lighting installations to be modified with relatively little cost.

From the foregoing it will be understood that my reflectors will give an excellent distribution of light for street lighting installations with beams of high candle power intensity directed from the parabolic surfaces adjacent the minor axis at high angles relative the nadir up and down the street, while light reflected from adjacent the major axis at lower angles and lower candle power intensity is directed in the "across the street" direction. The light reflected from the surfaces beyond the parabolic areas is directed at lowering and traversing angles relative the "up and down" the street beams. Thus a very desirable distribution of light on the street is obtained tending towards a uniformity of illumination over the whole street area.

In addition to the desirable results obtained with my reflector, it will also be understood that the reflector may be very readily formed to enable it to be economically manufactured.

The complete reflector can of course be finished to provide any desirable smooth or highly polished reflecting surface so that the actual efficiency of the reflecting surface can be made extremely high.

What I claim as my invention is:

1. A street lighting reflector comprising a dished reflecting shell of elongated generally ellipsoidal form having a horizontal major and minor axis and having a continuously smooth reflecting surface, the curvature of the reflecting surface adjacent each side of the reflector adjacent the minor axis being determined by fixing a point on the vertical axis of the shell as the focus of the shell at which a light source is to be located, drawing a line from a reference bottom of said shell through said focus point in the vertical plane of the minor axis and at an angle to the horizontal corresponding to a desired upward angle of reflected light concentration above the nadir, said line being of a length equal to approximately .97 of the desired minor diameter at the reference bottom of said shell and being bisected by said focus point, drawing a vertical arc with said line as radius from the upper end of said line to the reference bottom of the reflector, said arc being the desired vertical curvature of the shell adjacent the bottom thereof at the minor axis, the horizontal curvature of each side of the reflector adjacent the minor axis adjacent the reflector bottom being determined by swinging arcs in spaced horizontal planes with centres in vertical alignment with the centre of said vertical arc, the horizontal arcs being of decreasingly smaller length in planes upward from the reflector bottom, the curved area of the reflector adjacent the minor axis at each side of the reflector as determined by said vertical arc and said horizontal arcs forming a substantially parabolic area having a focal length equal to one-half the radius of the vertical and horizontal arcs and with the focus point coinciding with the focus of the shell located on the vertical axis thereof.

2. A street lighting reflector comprising, a dished reflecting shell having a vertical axis and of elongated generally ellipsoidal form having a horizontal major and minor axis and having a continuously smooth reflecting surface, the curvature of the reflecting surface adjacent each side of the reflector adjacent the minor axis being determined by fixing a point on the vertical axis of the shell as focus of the shell at which a light source is to be located, drawing a line through said focus point in the vertical plane of the minor axis and at an angle to the horizontal corresponding to a desired upward angle of reflected light concentration above the nadir, said line being bisected by said focus point and of a length determined by the desired length of the minor diameter and the said desired upward angle of reflected light concentration, drawing a vertical arc with said line as radius from the upper end of said line to a point substantially in horizontal alignment with the lower end of said line, said arc being the desired vertical curvature of the shell adjacent the bottom thereof at the minor diameter, the horizontal curvature of each side of the reflector adjacent the minor axis adjacent the reflector bottom being determined by swinging arcs in spaced horizontal planes with centres substantially in vertical alignment with the centre of the vertical arc, the horizontal arcs being of decreasingly smaller length in planes upward from the reflector bottom, the curved area of the reflector adjacent the minor axis at each side of the reflector as determined by said vertical arc and said horizontal arcs forming a substantially parabolic area having a focal length equal to one half the radius of the vertical and horizontal arcs and with the focus point coinciding with the focus of the shell located on the vertical axis thereof.

3. A street lighting reflector comprising, a dished reflecting shell having a vertical axis and of elongated generally ellipsoidal or oval form having horizontal major and minor axes, the curvature of the reflecting surface adjacent each side of the reflector adjacent the minor axis being such that the vertical curvature includes a vertical parabolic arc length having a focus on a point on the vertical axis of the shell to form the focal point of the shell, and a parabolic axis extending from the upper end of the arc length through the focus and at an angle to the horizontal corresponding to a desired upward angle of reflected light concentration and said arc length extending downwardly from said parabolic axis adjacent to the horizontal and the horizontal curvature in any horizontal plane below the upper end of said vertical arc length includes a horizontal parabolic arc length extending on either side of the minor axis and having a focus at said point and a parabolic axis coincident with the parabolic axis of said vertical arc length, the portion of said shell above and beyond said vertical and horizontal arc lengths being curved to systematically direct reflecting light rays at successively lowering angles below beams directed from the reflecting surfaces adjacent each side of the reflector as the top of the shell is approached and at horizontal angles tending away angularly from the minor axis as the major axis is approached.

4. A street lighting reflector comprising, a dished reflecting shell having a vertical axis and of elongated generally ellipsoidal or oval form having horizontal major and minor axes, the curvature of the reflecting surface adjacent each side of the reflector adjacent the minor axis being such that the vertical curvature includes a vertical parabolic arc length having a focus on a point on the vertical axis of the shell to form the focal point of the shell, and a parabolic axis extending from the upper end of the arc length through the focus and at an angle to the horizontal corresponding to a desired upward angle of reflected light concentration and said arc length extending downwardly from said parabolic axis to adjacent the horizontal and the horizontal curvature in any horizontal plane below the upper end of said vertical arc length includes a horizontal parabolic arc length extending on either side of the minor axis and having a focus at said focus point and a parabolic axis coincident with the parabolic axis of said vertical arc, and an outwardly turned flange at the bottom edge of said shell to retain the shell in its shape.

PERCIVAL H. MITCHELL.

REFERENCES CITED

The following references are of record in the file of this patent:

UNITED STATES PATENTS

| Number | Name | Date |
| --- | --- | --- |
| 1,677,678 | Maurer | July 17, 1928 |
| 1,855,867 | Pearse | Apr. 26, 1932 |
| 2,140,646 | Mitchell | Dec. 20, 1938 |
| 2,196,548 | Cohu et al. | Apr. 9, 1940 |
| 2,200,611 | Wilson | May 14, 1940 |
| 2,258,875 | Arras | Oct. 14, 1941 |
| 2,259,321 | Pahl | Oct. 14, 1941 |

FOREIGN PATENTS

| Number | Country | Date |
| --- | --- | --- |
| 190,206 | Switzerland | July 1, 1937 |
| 448,645 | Great Britain | June 12, 1936 |
| 810,790 | France | Jan. 6, 1937 |